(12) United States Patent
Qi et al.

(10) Patent No.: US 10,951,595 B2
(45) Date of Patent: Mar. 16, 2021

(54) METHOD, SYSTEM AND APPARATUS FOR STORING WEBSITE PRIVATE KEY PLAINTEXT

(71) Applicant: BEIJING BAIDU NETCOM SCIENCE AND TECHNOLOGY CO., LTD., Beijing (CN)

(72) Inventors: Wei Qi, Beijing (CN); Jian Ouyang, Beijing (CN); Yong Wang, Beijing (CN); Yichen Tu, Beijing (CN); Sijie Yang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 264 days.

(21) Appl. No.: 15/618,655

(22) Filed: Jun. 9, 2017

(65) Prior Publication Data

US 2018/0124023 A1    May 3, 2018

(30) Foreign Application Priority Data

Oct. 31, 2016    (CN) .......................... 201610976635.4

(51) Int. Cl.
| | |
|---|---|
| *G06F 21/00* | (2013.01) |
| *H04L 29/06* | (2006.01) |
| *H04L 29/08* | (2006.01) |
| *H04L 9/06* | (2006.01) |

(52) U.S. Cl.
CPC ........ *H04L 63/0435* (2013.01); *H04L 9/0618* (2013.01); *H04L 63/0442* (2013.01); *H04L 63/061* (2013.01); *H04L 63/168* (2013.01); *H04L 67/02* (2013.01)

(58) Field of Classification Search
CPC .... H04L 63/0442; H04L 63/061; H04L 67/02
See application file for complete search history.

(56) References Cited

U.S. PATENT DOCUMENTS

| | | | |
|---|---|---|---|
| 8,379,857 B1 * | 2/2013 | Zheng | H04L 9/0833 380/255 |
| 2008/0077796 A1 * | 3/2008 | Lund | H04L 63/0823 713/173 |

(Continued)

FOREIGN PATENT DOCUMENTS

CN         105939194 A     9/2016

*Primary Examiner* — Kendall Dolly
*Assistant Examiner* — Michael M Lee
(74) *Attorney, Agent, or Firm* — Lathrop GPM LLP

(57) ABSTRACT

The present application discloses a method, system and apparatus for storing a website private key plaintext. A specific implementation of the method includes: receiving a public key sent from a terminal configured to perform encryption and decryption, wherein the public key is generated at random by the terminal; encrypting a website private key plaintext by using the public key to generate a website private key ciphertext, wherein the website private key plaintext is pre-acquired; and sending the website private key ciphertext to the terminal, so that the terminal decrypts the website private key ciphertext by using the private key to generate the website private key plaintext and store the website private key plaintext in the terminal. This implementation improves the security of storage of the website private key plaintext.

17 Claims, 5 Drawing Sheets

(56) References Cited

U.S. PATENT DOCUMENTS

| | | | |
|---|---|---|---|
| 2010/0306525 A1* | 12/2010 | Ferguson | H04L 63/0442 713/151 |
| 2011/0161671 A1* | 6/2011 | Whitehouse | G06F 21/6236 713/171 |
| 2015/0095648 A1* | 4/2015 | Nix | H04W 4/70 713/170 |
| 2016/0013935 A1* | 1/2016 | Pahl | H04L 9/0844 713/171 |
| 2016/0226827 A1* | 8/2016 | Bohannon | H04L 63/0281 |
| 2016/0241389 A1* | 8/2016 | Le Saint | H04L 9/0844 |
| 2016/0277372 A1* | 9/2016 | Shah | H04L 63/061 |
| 2018/0234237 A1* | 8/2018 | Ye | |
| 2019/0089546 A1* | 3/2019 | Garcia Morchon | H04L 9/0825 |

\* cited by examiner

100

METHOD, SYSTEM AND APPARATUS FOR STORING WEBSITE PRIVATE KEY PLAINTEXT

CROSS-REFERENCE TO RELATED APPLICATION

This application is related to and claims priority from Chinese Application No. 201610976635.4, filed on Oct. 31, 2016 and entitled "Method, System and Apparatus for Storing Website Private Key Plaintext", the entire disclosure of which is hereby incorporated by reference.

TECHNICAL FIELD

The present application relates to the field of computer technology, specifically to the field of encryption and decryption technology, and more specifically to a method, system and apparatus for storing a website private key plaintext.

BACKGROUND

Currently, to ensure the security of website visits, many Internet companies have launched side-wide secured Hypertext Transport Protocol Server (HTTPS) search, to convert a Hypertext Transport Protocol (HTTP) request to an HTTPS by default. Before data is transmitted, the HTTPS needs to perform a handshake between a client (browser) and a server (website), and determine cryptographic information of encrypted data transmission between the client and server during the handshake process. Therefore, it is quite important to ensure the security of website private key certificates stored in website servers.

Currently, a website private key certificate is generally permanently stored as a file in a website server connected to the HTTPS. The website private key certificate may be stored after being encrypted by using certain encryption algorithms. However, even if the stored file can be encrypted, the website private key still exists in the plaintext form in the server at the HTTPS handshake stage. Once the website private key is acquired by an attacker, the user's privacy, passwords and properties will be seriously threatened.

SUMMARY

An objective of the present application is to provide an improved method, system and apparatus for storing a website private key plaintext, in order to solve the technical problem mentioned in the Background.

According to a first aspect, the present application provides a method for storing a website private key plaintext. The method comprises: receiving a public key sent from a terminal configured to perform encryption and decryption, wherein the public key is generated at random by the terminal; encrypting a website private key plaintext by using the public key to generate a website private key ciphertext, wherein the website private key plaintext is pre-acquired; and sending the website private key ciphertext to the terminal, so that the terminal decrypts the website private key ciphertext by using the private key to generate the website private key plaintext and store the website private key plaintext in the terminal.

In some embodiments, after the receiving a public key sent from a terminal configured to perform encryption and decryption, the method further comprises: checking the public key by: acquiring data with a preset length; encrypting the data by using the public key, to generate a data ciphertext; sending the data ciphertext to the terminal; receiving a data plaintext sent from the terminal, wherein the data plaintext is generated by the terminal by decrypting the data ciphertext with the private key; and checking whether the data plaintext is consistent with the data; if the data plaintext is consistent with the data, encrypting the website private key plaintext by using the public key; and if the data plaintext is not consistent with the data, sending an instruction for regenerating a key pair to the terminal, then receiving a public key sent from the terminal and repeating the checking of the public key.

In some embodiments, the sending the website private key ciphertext to the terminal comprises: sending to the terminal a website private key identifier corresponding to the website private key ciphertext obtained through encryption of the website private key plaintext to be added in response to a received instruction for adding the website private key plaintext, wherein the website private key identifier and the website private key ciphertext are pre-stored, and have a one-to-one correspondence.

In some embodiments, the sending the website private key ciphertext to the terminal comprises: sending to the terminal a website private key identifier corresponding to the website private key ciphertext obtained through encryption of the website private key plaintext to be deleted in response to a received instruction for deleting the website private key plaintext.

In some embodiments, the method further comprises: receiving a website ciphertext and a website private key identifier sent from a user terminal; sending the website ciphertext and the website private key identifier to the terminal; and receiving a website plaintext sent from the terminal, wherein the website plaintext is generated by the terminal by decrypting the website ciphertext with a found website private key plaintext corresponding to the website private key identifier.

According to a second aspect, the present application provides a method for storing a website private key plaintext, comprising: generating a key pair at random, wherein the key pair comprises a public key and a private key; sending the public key to a server; receiving a website private key ciphertext sent from the server, wherein the website private key ciphertext is generated by the server by encrypting a website private key plaintext with the public key, and the website private key plaintext is pre-acquired; decrypting the website private key ciphertext by using the private key, to generate the website private key plaintext; and storing the website private key plaintext.

In some embodiments, the method further comprises: receiving a data ciphertext sent from the server, wherein the data ciphertext is generated by the server by encrypting data with the public key; decrypting the data ciphertext by using the private key, to generate a data plaintext; and sending the data plaintext to the server.

In some embodiments, the method further comprises: regenerating a key pair at random in response to a received instruction for regenerating a key pair sent from the server, and sending a regenerated public key to the server.

In some embodiments, the receiving a website private key ciphertext sent from the server comprises: receiving, from the server, a website private key identifier corresponding to a website private key ciphertext obtained through encryption of a website private key plaintext to be added, wherein the website private key identifier and the website private key ciphertext are pre-stored and have a one-to-one correspondence, and the website private key identifier is sent from the server after the server receives an instruction for adding the website private key plaintext; and the storing the website private key plaintext comprises: storing correspondence relationship between the website private key plaintext and the website private key identifier.

In some embodiments, the receiving a website private key ciphertext sent from the server comprises: receiving, from the server, a website private key identifier corresponding to a website private key ciphertext obtained through encryption of a website private key plaintext to be deleted, wherein the website private key identifier is sent from the server after the server receives an instruction for deleting the website private key plaintext; searching for the website private key plaintext corresponding to the website private key identifier; and deleting the website private key plaintext and correspondence relationship between the website private key plaintext and the website private key identifier.

In some embodiments, the method further comprises: receiving a website ciphertext and a website private key identifier sent from the server, wherein the website ciphertext and the website private key identifier are received by the server and sent from a user terminal; searching for a website private key plaintext corresponding to the website private key identifier; decrypting the website ciphertext by using the website private key plaintext, to generate a website plaintext; and sending the website plaintext to the server.

According to a third aspect, the present application provides a system for storing a website private key plaintext, comprising: a server, configured to receive a public key sent from a terminal configured to perform encryption and decryption, encrypt a website private key plaintext by using the public key to generate a website private key ciphertext, and send the website private key ciphertext to the terminal, wherein the website private key plaintext is pre-acquired; and the terminal for encryption and decryption, configured to generate a key pair at random, send the public key to the server, receive the website private key ciphertext sent from the server, decrypt the website private key ciphertext by using the private key to generate the website private key plaintext, and store the website private key plaintext, wherein the key pair comprises the public key and the private key.

In some embodiments, the server is further configured to check the public key by: acquiring data with a preset length; encrypting the data by using the public key to generate a data ciphertext, sending the data ciphertext to the terminal, receiving a data plaintext sent from the terminal, checking whether the data plaintext is consistent with the data, encrypting the website private key plaintext by using the public key if the data plaintext is consistent with the data, and sending an instruction for regenerating a key pair to the terminal and then receiving a public key sent from the terminal and repeating the checking of the public key if the data plaintext is not consistent with the data; and the terminal for encryption and decryption is further configured to: receive a data ciphertext sent from the server, decrypt the data ciphertext by using the private key to generate a data plaintext, and then send the data plaintext to the server; and regenerate a key pair at random in response to a received instruction for regenerating a key pair sent from the server, and send a regenerated public key to the server.

In some embodiments, the server is further configured to send to the terminal a website private key identifier corresponding to the website private key ciphertext obtained through encryption of the website private key plaintext to be added in response to a received instruction for adding the website private key plaintext, wherein the website private key identifier and the website private key ciphertext are pre-stored, and have a one-to-one correspondence; and the terminal for encryption and decryption is further configured to receive, from the server, a website private key identifier corresponding to a website private key ciphertext obtained through encryption of a website private key plaintext to be added, and store correspondence relationship between the website private key plaintext and the website private key identifier.

In some embodiments, the server is further configured to send to the terminal a website private key identifier corresponding to the website private key ciphertext obtained through encryption of the website private key plaintext to be deleted in response to a received instruction for deleting the website private key plaintext; and the terminal for encryption and decryption is further configured to receive, from the server, a website private key identifier corresponding to a website private key ciphertext obtained through encryption of a website private key plaintext to be deleted, search for the website private key plaintext corresponding to the website private key identifier, and delete the website private key plaintext and correspondence relationship between the website private key plaintext and the website private key identifier.

In some embodiments, the server is further configured to receive a website ciphertext and a website private key identifier sent from a user terminal, send the website ciphertext and the website private key identifier to the terminal, and then receive a website plaintext sent from the terminal; and the terminal for encryption and decryption is further configured to receive a website ciphertext and a website private key identifier sent from the server, search for a website private key plaintext corresponding to the website private key identifier, decrypt the website ciphertext by using the website private key plaintext to generate a website plaintext, and then send the website plaintext to the server.

According to a fourth aspect, the present application provides an apparatus for storing a website private key plaintext, comprising: a first receiving unit, configured to receive a public key sent from a terminal configured to perform encryption and decryption, wherein the public key is generated at random by the terminal; an encryption unit, configured to encrypt a website private key plaintext by using the public key to generate a website private key ciphertext, wherein the website private key plaintext is pre-acquired; and a first sending unit, configured to send the website private key ciphertext to the terminal, so that the terminal decrypts the website private key ciphertext by using the private key to generate the website private key plaintext and store the website private key plaintext in the terminal.

In some embodiments, the apparatus further comprises: a checking unit, configured to check the public key by: acquiring data with a preset length; encrypting the data by using the public key, to generate a data ciphertext; sending the data ciphertext to the terminal; receiving a data plaintext sent from the terminal, wherein the data plaintext is generated by the terminal by decrypting the data ciphertext with the private key; checking whether the data plaintext is consistent with the data; encrypting the website private key plaintext by using the public key if the data plaintext is consistent with the data; and sending an instruction for regenerating a key pair to the terminal then receiving a public key sent from the terminal and repeating the checking of the public key if the data plaintext is not consistent with the data.

In some embodiments, the first sending unit is further configured to: send to the terminal a website private key identifier corresponding to the website private key ciphertext obtained through encryption of the website private key plaintext to be added in response to a received instruction for adding the website private key plaintext, wherein the website private key identifier and the website private key ciphertext are pre-stored, and have a one-to-one correspondence.

In some embodiments, the first sending unit is further configured to: send to the terminal a website private key identifier corresponding to the website private key ciphertext obtained through encryption of the website private key plaintext to be deleted in response to a received instruction for deleting the website private key plaintext.

In some embodiments, the apparatus further comprises: a second receiving unit, configured to receive a website ciphertext and a website private key identifier sent from a user terminal; a second sending unit, configured to send the website ciphertext and the website private key identifier to the terminal; and a third receiving unit, configured to receive a website plaintext sent from the terminal, wherein the website plaintext is generated by the terminal by decrypting the website ciphertext with a found website private key plaintext corresponding to the website private key identifier.

According to a fifth aspect, the present application provides an apparatus for storing a website private key plaintext, comprising: a generation unit, configured to generate a key pair at random, wherein the key pair comprises a public key and a private key; a first sending unit, configured to send the public key to a server; a first receiving unit, configured to receive a website private key ciphertext sent from the server, wherein the website private key ciphertext is generated by the server by encrypting a website private key plaintext with the public key, and the website private key plaintext is pre-acquired; a first decryption unit, configured to decrypt the website private key ciphertext by using the private key, to generate the website private key plaintext; and a storage unit, configured to store the website private key plaintext.

In some embodiments, the apparatus further comprises: a second receiving unit, configured to receive a data ciphertext sent from the server, wherein the data ciphertext is generated by the server by encrypting data with the public key; a second decryption unit, configured to decrypt the data ciphertext by using the private key, to generate a data plaintext; and a second sending unit, configured to send the data plaintext to the server.

In some embodiments, the apparatus further comprises: a third sending unit, configured to regenerate a key pair at random in response to a received instruction for regenerating a key pair sent from the server, and send a regenerated public key to the server.

In some embodiments, the first receiving unit is further configured to: receive, from the server, a website private key identifier corresponding to a website private key ciphertext obtained through encryption of a website private key plaintext to be added, wherein the website private key identifier and the website private key ciphertext are pre-stored and have a one-to-one correspondence, and the website private key identifier is sent from the server after the server receives an instruction for adding the website private key plaintext; and the storage unit is further configured to: store correspondence relationship between the website private key plaintext and the website private key identifier.

In some embodiments, the first receiving unit comprises: a receiving module, configured to receive, from the server, a website private key identifier corresponding to a website private key ciphertext obtained through encryption of a website private key plaintext to be deleted, wherein the website private key identifier is sent from the server after the server receives an instruction for deleting the website private key plaintext; a search module, configured to search for the website private key plaintext corresponding to the website private key identifier; and a deletion module, configured to delete the website private key plaintext and correspondence relationship between the website private key plaintext and the website private key identifier.

In some embodiments, the apparatus further comprises: a third receiving unit, configured to receive a website ciphertext and a website private key identifier sent from the server, wherein the website ciphertext and the website private key identifier are received by the server and sent from a user terminal; a search unit, configured to search for a website private key plaintext corresponding to the website private key identifier; a third decryption unit, configured to decrypt the website ciphertext by using the website private key plaintext, to generate a website plaintext; and a fourth sending unit, configured to send the website plaintext to the server.

According to the method, system and apparatus for storing a website private key plaintext that are provided in the embodiments, a terminal for encryption and decryption generates a public key and a private key at random, and sends the public key to a server; the server encrypts the website private key plaintext by using the public key, and sends the website private key ciphertext obtained after the encryption to the terminal, so that the terminal can decrypt the website private key ciphertext by using the private key, and stores the website private key plaintext obtained after the decryption, thereby improving the security of storage of website private key plaintext.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
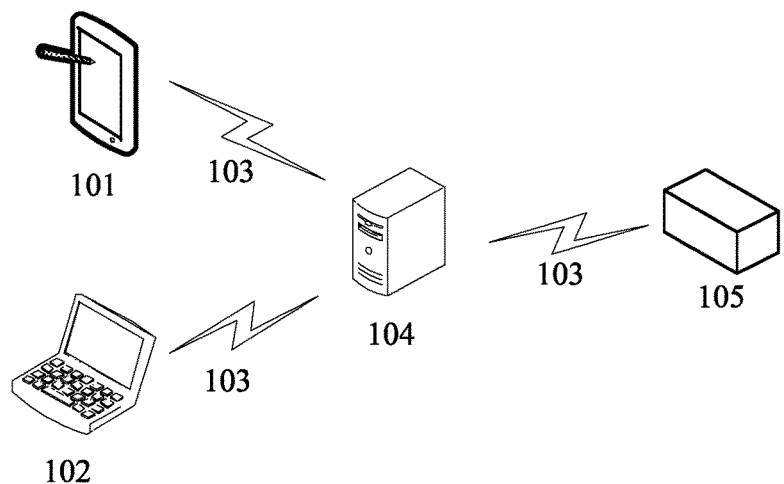
FIG. 1 is a diagram illustrating an exemplary architecture of a system for storing a website private key plaintext according to the present application.

FIG. 1 illustrates an exemplary architecture 100 of a system for storing a website private key plaintext according to the present application.

As shown in FIG. 1, the system architecture 100 may include user terminal devices 101 and 102, a network 103, a server 104, and a terminal device 105 configured to perform encryption and decryption. The network 103 serves as a medium for providing communication links between the user terminal device devices 101 and 102 and the server 104, and between the server 104 and the terminal device 105 configured to perform encryption and decryption. The network 103 may include various types of connections, such as wired and wireless communication links or optical fiber cables.

The user may use the user terminal devices 101 and 102 to interact with the server 104 through the network 103, in order to transmit or receive messages, etc. The user terminal devices 101 and 102 may be installed with various communication client applications, such as, webpage browser applications, shopping applications, and payment applications.

In response to a received website private key plaintext adding instruction, a website private key plaintext deleting instruction, and a web request from the user, the server 104 may interact with the terminal device 105 configured to perform encryption and decryption through the network 103, to transmit or receive messages, etc.

The user terminal devices 101 and 102 may be any electronic devices having a display and supporting web requests, including but not limited to, a smart phone, a tablet computer, an e-book reader, a Moving Picture Experts Group Audio Layer III (MP3) player, a Moving Picture Experts Group Audio Layer IV (MP4) player, a laptop portable computer, a desktop computer, and the like.

The terminal device 105 configured to perform encryption and decryption may be any terminal device loaded with an encryption and/or decryption program, for example, a terminal device including a Field-Programmable Gate Array (FPGA) chip loaded with an encryption and/or decryption program. The terminal device 105 configured to perform encryption and decryption may store a correspondence between website private key plaintext and a website private key identifier, may add and/or delete website private key plaintext according to a received website private key identifier, and may further perform an operation such as decryption on website ciphertext received.

The server 105 may be a server providing various services, for example, a background server for supporting websites requested by the user terminal devices 101 and 102, or a background server for storing a website private key plaintext by using the terminal device 105 configured to perform encryption and decryption. The background server may send data such as the received website ciphertext and website private key identifier to the terminal device 105 configured to perform encryption and decryption. The terminal device 105 configured to perform encryption and decryption perform processing, such as analysis, on the data, and performs data transmission with the user terminal devices by using a result of the processing (for example, website plaintext).

It should be understood that the numbers of the user terminal devices, the networks, the servers, and the terminal devices configured to perform encryption and decryption in FIG. 1 are merely illustrative. Any number of user terminal devices, networks, servers, and terminal devices may be provided based on the actual requirements.

Figure 2:
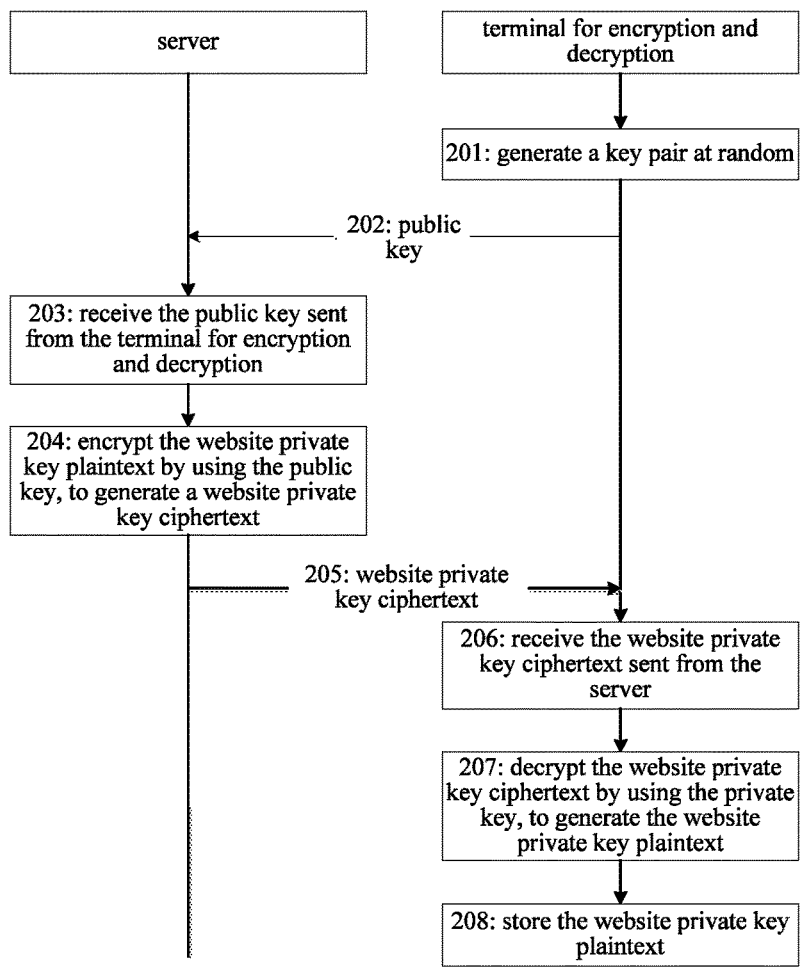
FIG. 2 is a timing sequence chart of a system for storing a website private key plaintext according to an embodiment of the present application.

FIG. 2 is a timing sequence chart of a system for storing a website private key plaintext according to an embodiment of the present application.

The system for storing a website private key plaintext according to this embodiment includes a server and a terminal configured to perform encryption and decryption. The server is configured to receive a public key sent from a terminal configured to perform encryption and decryption, encrypt a website private key plaintext by using the public key to generate a website private key ciphertext, and send the website private key ciphertext to the terminal, wherein the website private key plaintext is pre-acquired. The terminal for encryption and decryption is configured to generate a key pair at random, send the public key to the server, receive the website private key ciphertext sent from the server, decrypt the website private key ciphertext by using the private key to generate the website private key plaintext, and store the website private key plaintext, wherein the key pair comprises the public key and the private key.

According to the system for storing a website private key plaintext that is provided in this embodiment, a terminal for encryption and decryption generates a public key and a private key at random, and sends the public key to a server; the server encrypts the website private key plaintext by using the public key, and sends the website private key ciphertext obtained after the encryption to the terminal, so that the terminal can decrypt the website private key ciphertext by using the private key, and stores the website private key plaintext obtained after the decryption, thereby improving the security of storage of website private key plaintext.

In some optional implementations of this embodiment, the system for storing a website private key plaintext may further include a user terminal. The user terminal is configured to send a website ciphertext and a website private key identifier to the server, so as to establish a connection to implement data transmission.

As shown in FIG. 2, at step 201, the terminal configured to perform encryption and decryption generates a key pair at random.

Herein, the key pair includes a public key and a private key. The terminal configured to perform encryption and decryption may store the private key therein, and is unreadable externally. If data is encrypted by using the public key in the key pair, the data needs to be decrypted by using the private key in the key pair; if data is encrypted by using the private key in the key pair, the data needs to be decrypted by using the public key in the key pair; otherwise, the data cannot be decrypted successfully. The terminal configured to perform encryption and decryption may be a terminal device including an FPGA chip loaded with an encryption and/or decryption program.

At step 202, the terminal configured to perform encryption and decryption sends the public key to the server.

Herein, after generating the key pair, the terminal configured to perform encryption and decryption may send the public key in the key pair to the server connected in advance thereto, so that the server uses the public key to encrypt website private key plaintext that is acquired in advance, to generate website private key ciphertext.

At step 203, the server receives the public key sent from the terminal configured to perform encryption and decryption.

Herein, the server receive the public key sent by the terminal configured to perform encryption and decryption, where the public key is generated at random by the terminal configured to perform encryption and decryption.

At step 204, the server encrypts the website private key plaintext by using the public key, to generate a website private key ciphertext.

Herein, the server encrypts website private key plaintext by using the public key, for example, based on an asymmetric encryption algorithm (for example, an RSA encryption algorithm), to generate website private key ciphertext, where the website private key plaintext is acquired in advance by the server from an offline server. To ensure the security, an offline server may be provided in the design of the system for storing a website private key plaintext, and the website private key plaintext is stored in the offline server.

At step 205, the server sends the website private key ciphertext to the terminal configured to perform encryption and decryption.

Herein, the server sends the website private key ciphertext to the terminal configured to perform encryption and decryption, so that the terminal configured to perform encryption and decryption decrypts the website private key ciphertext by using the private key generated at random, and stores therein website private key plaintext obtained after the decryption.

At step 206, the terminal configured to perform encryption and decryption receives the website private key ciphertext sent from the server.

Herein, the website private key ciphertext is obtained by the server by encrypting a website private key plaintext by using the received public key, and the website private key plaintext is acquired in advance.

At step 207, the terminal configured to perform encryption and decryption decrypts the website private key ciphertext by using the private key, to generate the website private key plaintext.

Herein, the terminal configured to perform encryption and decryption decrypts the website private key ciphertext received from the server by using the private key, for example, based on an asymmetric decryption algorithm (for example, an RSA decryption algorithm), to generate website private key plaintext.

At step 208, the terminal configured to perform encryption and decryption stores the website private key plaintext.

Herein, the terminal configured to perform encryption and decryption stores the website private key plaintext obtained after the decryption.

In some optional implementations of this embodiment, the server performs the following step for checking the public key: First, the server acquires data of a preset length, where the preset length may be 512 bits, 1024 bits, 2048 bits, etc., and the data may be any data of the preset length. Then, the server encrypts the data by using the public key to generate data ciphertext, and calls an RSA Challenge interface (an interface for checking validity of the public key) to send the data ciphertext to the terminal configured to perform encryption and decryption. When the terminal configured to perform encryption and decryption receives an RSA Challenge command (a command for checking validity of the public key), the terminal configured to perform encryption and decryption receives, through the RSA Challenge interface, the data ciphertext sent by the server. Then, the terminal configured to perform encryption and decryption decrypts the data ciphertext by using the private key, for example, based on asymmetric decryption algorithm, to generate data plaintext. Afterwards, the terminal configured to perform encryption and decryption sends the data plaintext to the server. After receiving the data plaintext sent by the terminal configured to perform encryption and decryption, the server checks whether the data plaintext is consistent with the data. If yes, it indicates that the public key is valid, and the server performs step 204; if no, it indicates that the public key is not valid, and the server sends a key pair regeneration instruction to the terminal configured to perform encryption and decryption. After receiving the key pair regeneration instruction sent by the server, the terminal configured to perform encryption and decryption regenerates a key pair at random, and sends the regenerated public key to the server. Then, the server receives the public key sent by the terminal configured to perform encryption and decryption, and continues to perform the step of checking the public key, until it is determined that the public key is a valid public key.

In some optional implementations of this embodiment, before transmitting data to a user terminal, the server may perform a handshake with the user terminal. During the handshake process, the server may first receive website ciphertext and a website private key identifier that are sent by the user terminal. Then, the server sends the website ciphertext and the website private key identifier to the terminal configured to perform encryption and decryption. After receiving the website ciphertext and the website private key identifier that are sent by the server, the terminal configured to perform encryption and decryption searches for website private key plaintext corresponding to the website private key identifier. Afterwards, the terminal configured to perform encryption and decryption decrypts the website ciphertext by using the website private key plaintext to generate website plaintext, and sends the website plaintext generated after the decryption to the server. Finally, the server receives the website plaintext sent by the terminal configured to perform encryption and decryption.

Figure 3:
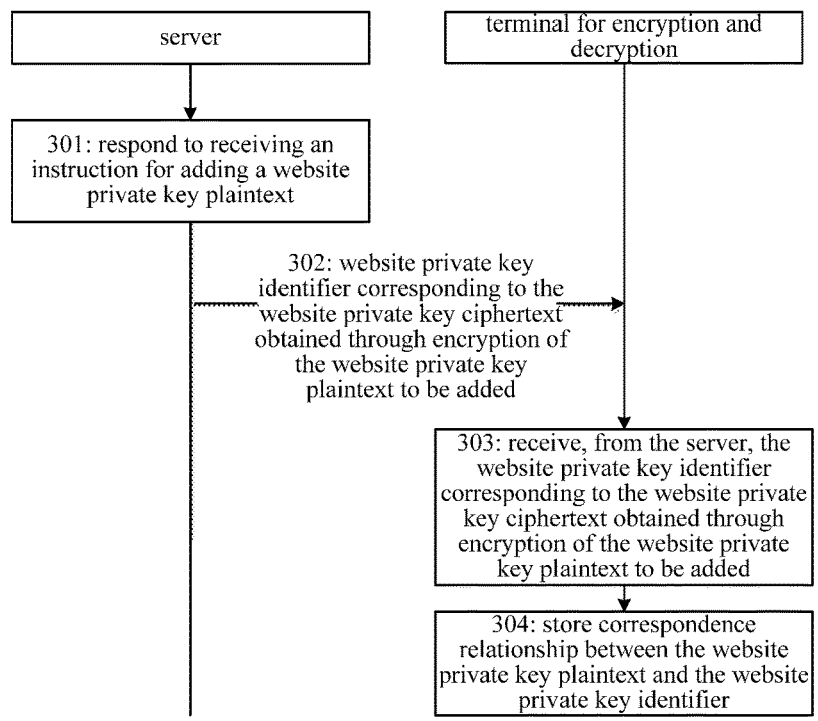
FIG. 3 is a timing sequence chart of a system for storing a website private key plaintext according to another embodiment of the present application.

FIG. 3 is a timing sequence chart of a system for storing a website private key plaintext according to another embodiment of the present application.

The system for storing a website private key plaintext according to this embodiment includes a server and a terminal configured to perform encryption and decryption. The server is further configured to send to the terminal a website private key identifier corresponding to the website private key ciphertext obtained through encryption of the website private key plaintext to be added in response to a received instruction for adding the website private key plaintext, wherein the website private key identifier and the website private key ciphertext are pre-stored, and have a one-to-one correspondence. The terminal for encryption and decryption is further configured to receive, from the server, a website private key identifier corresponding to a website private key ciphertext obtained through encryption of a website private key plaintext to be added, and store correspondence relationship between the website private key plaintext and the website private key identifier.

As shown in FIG. 3, at step 301, the server receives an instruction for adding a website private key plaintext.

Herein, the instruction for adding a website private key plaintext may include to-be-added website private key plaintext.

At step 302, the server sends to the terminal for encryption and decryption a website private key identifier corresponding to the website private key ciphertext obtained through encryption of the website private key plaintext to be added.

Herein, the server first acquires to-be-added website private key plaintext. Then, the server encrypts the website private key plaintext, to generate website private key ciphertext. Afterwards, the server searches for a website private key identifier corresponding to the website private key ciphertext, where the correspondence between the website private key ciphertext and the website private key identifier is stored in advance, and is a one-to-one correspondence. Finally, the server sends the website private key identifier to the terminal configured to perform encryption and decryption. The server may acquire, from an offline server, the website private key identifier corresponding to the website private key ciphertext. To ensure the security, an offline server may be provided in the design of the system for storing a website private key plaintext, and the website private key plaintext is stored in the offline server. Afterwards, the offline server encrypts the website private key plaintext by using a public key of a Secure Socket Layer (SSL) acceleration card, to obtain website private key ciphertext. Then, the offline server performs calculation on the website private key ciphertext by using Message-Digest Algorithm 5 (MD5), to obtain a website private key identifier.

At step 303, the terminal configured to perform encryption and decryption receives, from the server, the website private key identifier corresponding to the website private key ciphertext obtained through encryption of the website private key plaintext to be added.

Herein, the website private key identifier is the website private key identifier corresponding to the website private key ciphertext, which is acquired from the offline server by the server after receiving the website private key plaintext adding instruction. The website private key identifier and the website private key ciphertext are stored in advance, and have a one-to-one correspondence.

At step 304, the terminal configured to perform encryption and decryption stores correspondence relationship between the website private key plaintext and the website private key identifier.

Herein, the terminal configured to perform encryption and decryption stores a correspondence between the to-be-added website private key plaintext and the website private key identifier.

Figure 4:
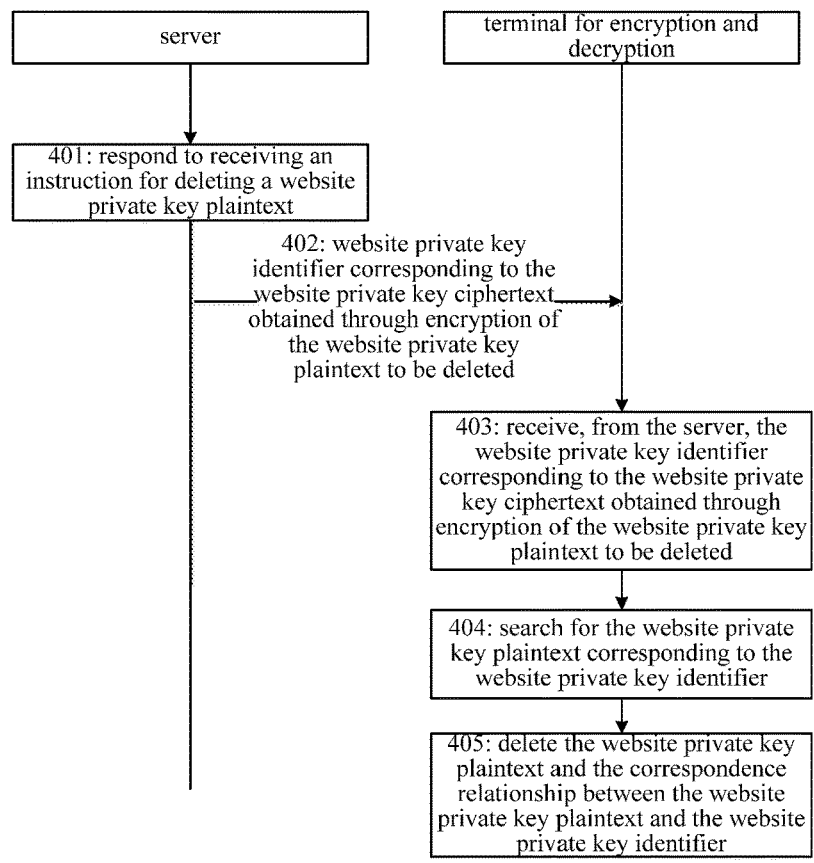
FIG. 4 is a timing sequence chart of a system for storing a website private key plaintext according to still another embodiment of the present application.

FIG. 4 is a timing sequence chart of a system for storing a website private key plaintext according to still another embodiment of the present application.

The system for storing a website private key plaintext according to this embodiment includes a server and a terminal configured to perform encryption and decryption. The server is further configured to send to the terminal a website private key identifier corresponding to the website private key ciphertext obtained through encryption of the website private key plaintext to be deleted in response to a received instruction for deleting the website private key plaintext. The terminal for encryption and decryption is further configured to receive, from the server, a website private key identifier corresponding to a website private key ciphertext obtained through encryption of a website private key plaintext to be deleted, search for the website private key plaintext corresponding to the website private key identifier, and delete the website private key plaintext and correspondence relationship between the website private key plaintext and the website private key identifier.

As shown in FIG. 4, at step 401, the server receives an instruction for deleting a website private key plaintext.

Herein, the instruction for deleting a website private key plaintext may include to-be-deleted website private key plaintext.

At step 402, the server sends to the terminal for encryption and decryption a website private key identifier corresponding to the website private key ciphertext obtained through encryption of the website private key plaintext to be deleted.

Herein, the server first acquires to-be-deleted website private key plaintext. Then, the server encrypts the website private key plaintext, to generate website private key ciphertext. Afterwards, the server searches for a website private key identifier corresponding to the website private key ciphertext, where the correspondence between the website private key ciphertext and the website private key identifier is stored in advance, and is a one-to-one correspondence. Finally, the server sends the website private key identifier to the terminal configured to perform encryption and decryption.

At step 403, the terminal configured to perform encryption and decryption receives, from the server, the website private key identifier corresponding to the website private key ciphertext obtained through encryption of the website private key plaintext to be deleted.

Herein, the terminal configured to perform encryption and decryption receives, from the server, the website private key identifier corresponding to the website private key ciphertext obtained through encryption of the to-be-deleted website private key plaintext, where the website private key identifier is the website private key identifier corresponding to the website private key ciphertext, which is acquired from an offline server by the server after receiving the website private key plaintext deleting instruction.

At step 404, the terminal configured to perform encryption and decryption searches for the website private key plaintext corresponding to the website private key identifier.

Herein, the terminal configured to perform encryption and decryption uses the website private key identifier to search for the corresponding a website private key plaintext.

At step 405, the terminal configured to perform encryption and decryption deletes the website private key plaintext and the correspondence relationship between the website private key plaintext and the website private key identifier.

Herein, the terminal configured to perform encryption and decryption deletes the website private key plaintext and the correspondence between the website private key plaintext and the website private key identifier.

Figure 5:
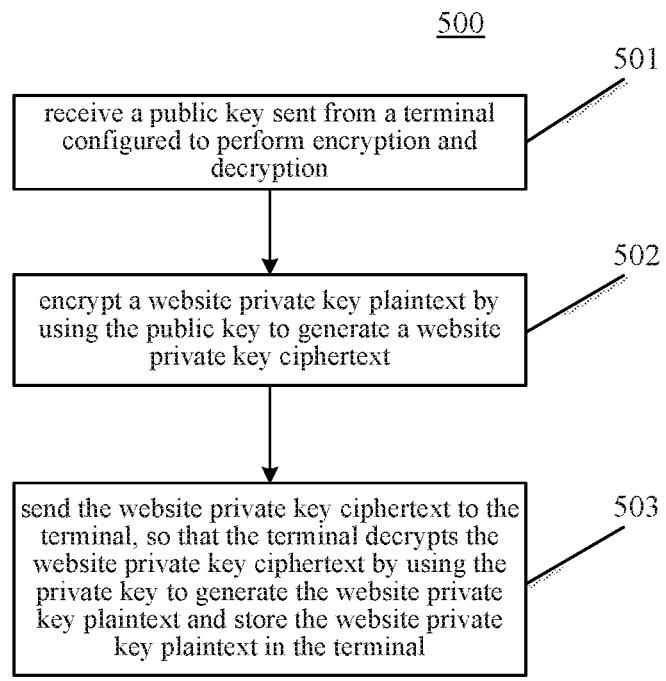
FIG. 5 is a flow chart of a method for storing a website private key plaintext according to an embodiment of the present application.

Referring to FIG. 5, a flow 500 of a method for storing a website private key plaintext according to an embodiment of the present application is illustrated. The method for storing a website private key plaintext according to this embodiment is generally performed by a server shown in FIG. 1. The method for storing a website private key plaintext includes the following steps.

At step 501, a public key sent from a terminal configured to perform encryption and decryption is received.

In this embodiment, an electronic device (for example, the server shown in FIG. 1) on which the method for storing a website private key plaintext runs may receive a public key sent by a terminal configured to perform encryption and decryption. The terminal configured to perform encryption and decryption may be a terminal device including an FPGA chip loaded with an encryption and/or decryption program. The public key is generated at random by the terminal.

In some optional implementations of this embodiment, the electronic device (for example, the server shown in FIG. 1) may perform the following step for checking the public key: First, the electronic device may acquire data of a preset length, where the preset length may be 512 bits, 1024 bits, 2048 bits, etc., and the data may be any data of the preset length. Then, the electronic device may encrypt the data by using the public key to generate data ciphertext, and call an RSA Challenge interface to send the data ciphertext to the terminal. Afterwards, the electronic device may receive data plaintext sent by the terminal, where the data plaintext is generated by the terminal by decrypting the received data ciphertext by using the private key. Finally, the electronic device may check whether the data plaintext is consistent with the data. If yes, it indicates that the public key is valid, and the server performs step 502; if no, it indicates that the public key is not valid, and the electronic device may send a key pair regeneration instruction to the terminal, then receive a public key sent by the terminal, and continue to perform the step of checking the public key, until it is determined that the public key is a valid public key.

At step 502, a website private key plaintext is encrypted by using the public key, to generate a website private key ciphertext.

In this embodiment, after receiving the public key at step 501, the electronic device may encrypt website private key plaintext by using the public key, for example, based on an asymmetric encryption algorithm (for example, an RSA encryption algorithm), to generate website private key ciphertext, where the website private key plaintext is acquired in advance by the electronic device (for example, an online server) from an offline server. To ensure the security, an offline server may be provided in the design of the system for storing a website private key plaintext, and the website private key plaintext is stored in the offline server.

At step 503, the website private key ciphertext is sent to the terminal, so that the terminal decrypts the website private key ciphertext by using the private key to generate the website private key plaintext and store the website private key plaintext in the terminal.

In this embodiment, at after the website private key ciphertext is generated at step 502, the electronic device may send the website private key ciphertext to the terminal configured to perform encryption and decryption, so that the terminal may decrypt the website private key ciphertext by using the private key generated at random, and store therein the website private key plaintext obtained after the decryption.

In some optional implementations of this embodiment, after receiving a website private key plaintext adding instruction, the electronic device may first acquire to-be-added website private key plaintext. Then, the electronic device may encrypt the website private key plaintext, to generate website private key ciphertext. Afterwards, the electronic device searches for a website private key identifier corresponding to the website private key ciphertext, where the correspondence between the website private key ciphertext and the website private key identifier is stored in advance, and is a one-to-one correspondence. Finally, the electronic device sends the website private key identifier to the terminal. The electronic device may acquire, from an offline server, the website private key identifier corresponding to the website private key ciphertext. To ensure the security, an offline server may be provided in the design of the system for storing a website private key plaintext, and the website private key plaintext is stored in the offline server. Afterwards, the offline server may encrypt the website private key plaintext by using a public key of an SSL acceleration card, to obtain website private key ciphertext. Then, the offline server may perform calculation on the website private key ciphertext by using MD5, to obtain a website private key identifier.

In some optional implementations of this embodiment, after receiving a website private key plaintext deleting instruction, the electronic device may first acquire to-be-deleted website private key plaintext. Then, the electronic device may encrypt the website private key plaintext, to generate website private key ciphertext. Afterwards, the electronic device searches for a website private key identifier corresponding to the website private key ciphertext, where the correspondence between the website private key ciphertext and the website private key identifier is stored in advance, and is a one-to-one correspondence. Finally, the electronic device sends the website private key identifier to the terminal.

In some optional implementations of this embodiment, before transmitting data to a user terminal, the electronic device (for example, the server shown in FIG. 1) may perform a handshake with the user terminal. During the handshake process, the electronic device may first receive website ciphertext and a website private key identifier that are sent by the user terminal. Then, the electronic device may send the website ciphertext and the website private key identifier to the terminal, so that the terminal may search for website private key plaintext corresponding to the website private key identifier, and decrypt the website ciphertext by using the website private key plaintext to generate website plaintext. Finally, the electronic device may receive the website plaintext sent by the terminal.

Figure 6:
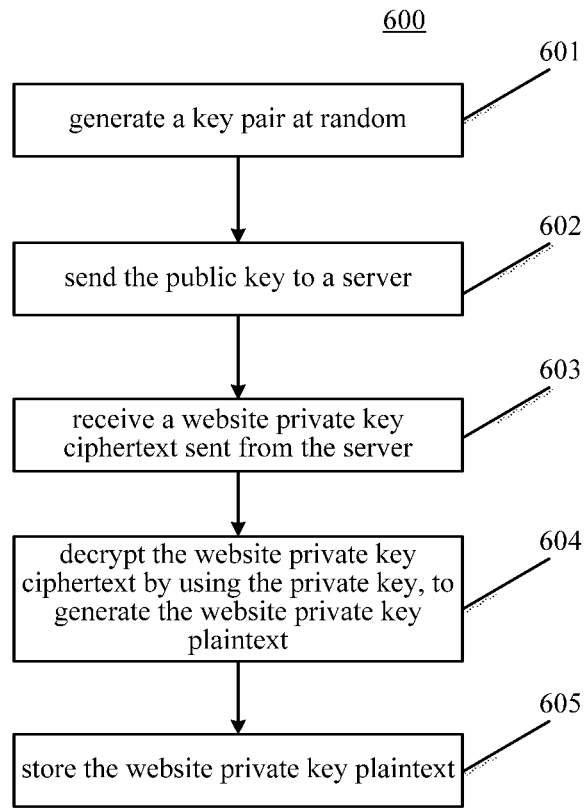
FIG. 6 is a flow chart of a method for storing a website private key plaintext according to another embodiment of the present application.

Referring to FIG. 6, a flow 600 of a method for storing a website private key plaintext according to another embodiment of the present application is illustrated. The method for storing a website private key plaintext according to this embodiment is generally performed by the terminal configured to perform encryption and decryption shown in FIG. 1. The method for storing a website private key plaintext includes the following steps.

At step 601, a key pair is generated at random.

In this embodiment, an electronic device (for example, the terminal configured to perform encryption and decryption shown in FIG. 1) on which the method for storing a website private key plaintext runs may generate a key pair at random at an initialization stage. The key pair includes a public key and a private key. The electronic device may store the private key therein, and is unreadable externally. If data is encrypted by using the public key in the key pair, the data needs to be decrypted by using the private key in the key pair; if data is encrypted by using the private key in the key pair, the data needs to be decrypted by using the public key in the key pair; otherwise, the data cannot be decrypted successfully. The electronic device may be a terminal device including an FPGA chip loaded with an encryption and/or decryption program.

At step 602, the public key is sent to a server.

In this embodiment, after the key pair is generated at random at step 601, the electronic device (for example, the terminal configured to perform encryption and decryption shown in FIG. 1) on which the method for storing a website private key plaintext runs may send the public key in the key pair to a server, so that the server uses the public key to encrypt website private key plaintext that is acquired in advance, to generate website private key ciphertext.

At step 603, a website private key ciphertext sent from the server is received.

In this embodiment, the electronic device (for example, the terminal configured to perform encryption and decryption shown in FIG. 1) on which the method for storing a website private key plaintext runs may receive website private key ciphertext sent by the server, where the website private key ciphertext is obtained by the server by encrypting a website private key plaintext by using the received public key, and the website private key plaintext is acquired in advance.

In some optional implementations of this embodiment, the electronic device (for example, the terminal configured to perform encryption and decryption shown in FIG. 1) may first receive, from the server, a website private key identifier corresponding to website private key ciphertext obtained through encryption of to-be-added website private key plaintext. The website private key identifier may be the website private key identifier corresponding to the website private key ciphertext, which is acquired from an offline server by the server after receiving a website private key plaintext adding instruction. The website private key identifier and the website private key ciphertext are stored in advance, and have a one-to-one correspondence. Then, the electronic device may store a correspondence between the to-be-added website private key plaintext and the website private key identifier.

In some optional implementations of this embodiment, the electronic device (for example, the terminal configured to perform encryption and decryption shown in FIG. 1) may first receive, from the server, a website private key identifier corresponding to website private key ciphertext obtained through encryption of to-be-deleted website private key plaintext. The website private key identifier may be the website private key identifier corresponding to the website private key ciphertext, which is acquired from an offline server by the server after receiving a website private key plaintext deleting instruction. The website private key identifier and the website private key ciphertext are stored in advance, and have a one-to-one correspondence. Then, the electronic device may search for the website private key plaintext corresponding to the website private key identifier. Finally, the electronic device may delete the website private key plaintext and the correspondence between the website private key plaintext and the website private key identifier.

At step 604, the website private key ciphertext is decrypted by using the private key, to generate the website private key plaintext.

In this embodiment, the electronic device (for example, the terminal configured to perform encryption and decryption shown in FIG. 1) on which the method for storing a website private key plaintext runs may decrypt the website private key ciphertext received from the server by using the private key, for example, based on an asymmetric decryption algorithm, to generate website private key plaintext.

At step 605, the website private key plaintext is stored.

In this embodiment, the electronic device (for example, the terminal configured to perform encryption and decryption shown in FIG. 1) on which the method for storing a website private key plaintext runs may store the website private key plaintext generated at step 604.

In some optional implementations of this embodiment, after receiving an RSA Challenge command, the electronic device (for example, the terminal configured to perform encryption and decryption shown in FIG. 1) may first receive, through an RSA Challenge interface, data ciphertext sent by the server, where the data ciphertext is obtained by the server by decrypting any data of a preset length by using the public key, when checking validity of the public key. Then, the electronic device may decrypt the data ciphertext by using the private key, for example, based on an asymmetric decryption algorithm, to generate data plaintext. Finally, the electronic device may send the data plaintext to the server.

In some optional implementations of this embodiment, after receiving a key pair regeneration instruction sent by the server, the electronic device (for example, the terminal configured to perform encryption and decryption shown in FIG. 1) may regenerate a key pair at random, and send the regenerated public key to the server.

In some optional implementations of this embodiment, the electronic device (for example, the terminal configured to perform encryption and decryption shown in FIG. 1) may first receive website ciphertext and a website private key identifier that are sent by the server, where the website ciphertext and the website private key identifier are received from the user terminal by the server during the handshake process with the user terminal. Then, the electronic device may search for website private key plaintext corresponding to the website private key identifier. Afterwards, the electronic device may decrypt the website ciphertext by using the website private key plaintext to generate website plaintext. Finally, the electronic device may send the website plaintext generated after the decryption to the server.

Figure 7:
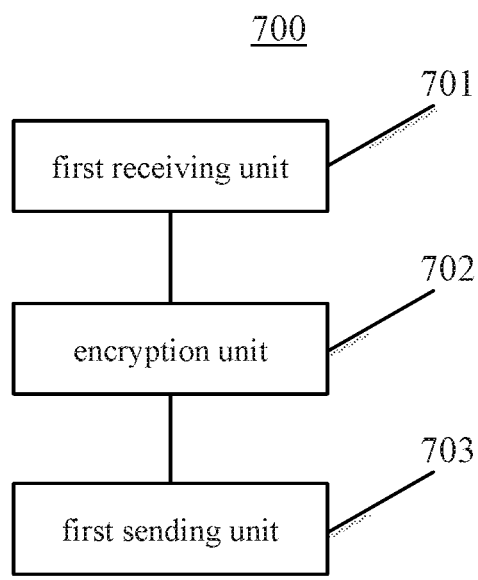
FIG. 7 is a schematic structural diagram of an apparatus for storing a website private key plaintext according to an embodiment of the present application.

Referring to FIG. 7, as an implementation of the methods shown in the above-mentioned figures, the present application provides an embodiment of an apparatus for storing a website private key plaintext. This apparatus embodiment corresponds to the method embodiment shown in FIG. 5. The apparatus may be specifically applied to various electronic devices.

As shown in FIG. 7, the apparatus for storing a website private key plaintext 700 according to this embodiment includes a first receiving unit 701, an encryption unit 702, and a first sending unit 703. The first receiving unit 701 is configured to receive a public key sent from a terminal configured to perform encryption and decryption, wherein the public key is generated at random by the terminal. The encryption unit 702 is configured to encrypt a website private key plaintext by using the public key to generate a website private key ciphertext, wherein the website private key plaintext is pre-acquired. The first sending unit 703 is configured to send the website private key ciphertext to the terminal, so that the terminal decrypts the website private key ciphertext by using the private key to generate the website private key plaintext and store the website private key plaintext in the terminal.

In this embodiment, the first receiving unit 701 of the apparatus for storing a website private key plaintext 700 may receive a public key sent by a terminal configured to perform encryption and decryption. The terminal configured to perform encryption and decryption may be a terminal device including an FPGA chip loaded with an encryption and/or decryption program. The public key is generated at random by the terminal.

In this embodiment, after the first receiving unit 701 receives the public key, the encryption unit 702 may encrypt website private key plaintext by using the public key, for example, based on an asymmetric encryption algorithm, to generate website private key ciphertext.

In this embodiment, the first sending unit 703 may send the website private key ciphertext to the terminal configured to perform encryption and decryption, so that the terminal may decrypt the website private key ciphertext by using the private key generated at random, and store therein the website private key plaintext obtained after the decryption.

In some optional implementations of this embodiment, the apparatus for storing a website private key plaintext 700 may further include a checking unit. The checking unit may perform the following step for checking the public key: First, the checking unit may acquire data of a preset length, where the preset length may be 512 bits, 1024 bits, 2048 bits, etc., and the data may be any data of the preset length. Then, the checking unit may encrypt the data by using the public key to generate data ciphertext, and call an RSA Challenge interface to send the data ciphertext to the terminal. Afterwards, the checking unit may receive data plaintext sent by the terminal, where the data plaintext is generated by the terminal by decrypting the received data ciphertext by using the private key. Finally, the checking unit may check whether the data plaintext is consistent with the data. If yes, it indicates that the public key is valid, and the encryption step is performed by using the encryption unit 702; if no, it indicates that the public key is not valid, and the checking unit may send a key pair regeneration instruction to the terminal, then receive a public key sent by the terminal, and continue to perform the step of checking the public key, until it is determined that the public key is a valid public key.

In some optional implementations of this embodiment, after receiving a website private key plaintext adding instruction, the first sending unit 703 may first acquire to-be-added website private key plaintext. Then, the first sending unit 703 may decrypt the website private key plaintext, to generate website private key ciphertext. Afterwards, the first sending unit 703 searches for a website private key identifier corresponding to the website private key ciphertext. Finally, the first sending unit 703 sends the website private key identifier to the terminal. The first sending unit 703 may acquire, from an offline server, the website private key identifier corresponding to the website private key ciphertext.

In some optional implementations of this embodiment, after receiving a website private key plaintext deleting instruction, the first sending unit 703 may first acquire to-be-deleted website private key plaintext. Then, the first sending unit 703 may encrypt the website private key plaintext, to generate website private key ciphertext. Afterwards, the first sending unit 703 searches for a website private key identifier corresponding to the website private key ciphertext.

In some optional implementations of this embodiment, the apparatus for storing a website private key plaintext 700 may further include a second receiving unit, a second sending unit, and a third receiving unit. Before transmitting data to a user terminal, the second receiving unit may perform a handshake with the user terminal. During the handshake process, the second receiving unit may first receive website ciphertext and a website private key identifier that are sent by the user terminal. Then, the second sending unit may send the website ciphertext and the website private key identifier to the terminal, so that the terminal may search for website private key plaintext corresponding to the website private key identifier, and decrypt the website ciphertext by using the website private key plaintext to generate website plaintext. Finally, the third receiving unit may receive the website plaintext sent by the terminal.

Figure 8:
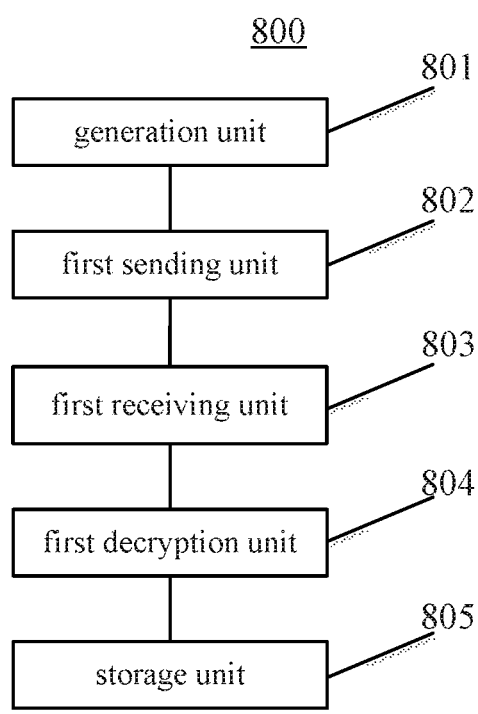
FIG. 8 is a schematic structural diagram of an apparatus for storing a website private key plaintext according to another embodiment of the present application.

Referring to FIG. 8, as an implementation of the methods shown in the above-mentioned figures, the present application provides another embodiment of an apparatus for storing a website private key plaintext. This apparatus embodiment corresponds to the method embodiment shown in FIG. 6. The apparatus may be specifically applied to various electronic devices.

As shown in FIG. 8, the apparatus for storing a website private key plaintext 800 according to this embodiment includes a generation unit 801, a first sending unit 802, a first receiving unit 803, a first decryption unit 804, and a storage unit 805. The generation unit 801 is configured to generate a key pair at random, wherein the key pair comprises a public key and a private key. The first sending unit 802 is configured to send the public key to a server. The first receiving unit 803 is configured to receive a website private key ciphertext sent from the server, wherein the website private key ciphertext is generated by the server by encrypting a website private key plaintext with the public key, and the website private key plaintext is pre-acquired. The first decryption unit 804 is configured to decrypt the website private key ciphertext by using the private key, to generate the website private key plaintext. The storage unit 805 is configured to store the website private key plaintext.

In this embodiment, the generation unit 801 of the apparatus for storing a website private key plaintext 800 may generate a key pair at random at an initialization stage, where the key pair includes a public key and a private key.

In this embodiment, after the generation unit 801 generates the key pair at random, the first sending unit 802 may send the public key in the key pair to the server, so that the server uses the public key to encrypt website private key plaintext that is acquired in advance, to generate website private key ciphertext.

In this embodiment, the first receiving unit 803 may receive the website private key ciphertext sent by the server, where the website private key ciphertext is obtained by the server by encrypting a website private key plaintext by using the received public key, and the website private key plaintext is acquired in advance.

In this embodiment, the first decryption unit 804 may decrypt the website private key ciphertext received from the server by using the private key, for example, based on an asymmetric decryption algorithm, to generate website private key plaintext.

In this embodiment, the storage unit 805 may store the website private key plaintext generated by the first decryption unit 804.

In some optional implementations of this embodiment, the apparatus for storing a website private key plaintext 800 may further include a second receiving unit, a second decryption unit, and a second sending unit. The second receiving unit may first receive, through an RSA Challenge interface, data ciphertext sent by the server, where the data ciphertext is obtained by the server by decrypting any data of a preset length by using the public key, when checking validity of the public key. Then, the second decryption unit may decrypt the data ciphertext by using the private key, for example, based on an asymmetric decryption algorithm, to generate data plaintext. Finally, the second sending unit may send the data plaintext to the server.

In some optional implementations of this embodiment, the apparatus for storing a website private key plaintext 800 may further include a third sending unit. After receiving a key pair regeneration instruction sent by the server, the third sending unit may regenerate a key pair at random, and send the regenerated public key to the server.

In some optional implementations of this embodiment, the first receiving unit 803 may first receive, from the server, a website private key identifier corresponding to website private key ciphertext obtained through encryption of to-be-added website private key plaintext. The website private key identifier may be the website private key identifier corresponding to the website private key ciphertext, which is acquired from an offline server by the server after receiving a website private key plaintext adding instruction. The website private key identifier and the website private key ciphertext are stored in advance, and have a one-to-one correspondence. Then, the storage unit 805 may store a correspondence between the to-be-added website private key plaintext and the website private key identifier.

In some optional implementations of this embodiment, the first receiving unit 803 may include a receiving module, a search module, and a deletion module. The receiving module may first receive, from the server, a website private key identifier corresponding to website private key ciphertext obtained through encryption of to-be-deleted website private key plaintext. The website private key identifier may be the website private key identifier corresponding to the website private key ciphertext, which is acquired from an offline server by the server after receiving a website private key plaintext deleting instruction. The website private key identifier and the website private key ciphertext are stored in advance, and have a one-to-one correspondence. Then, the search module may search for the website private key plaintext corresponding to the website private key identifier. Finally, the deletion module may delete the website private key plaintext and the correspondence between the website private key plaintext and the website private key identifier.

In some optional implementations of this embodiment, the apparatus for storing a website private key plaintext 800 may further include a third receiving unit, a search unit, a third decryption unit, and a fourth sending unit. The third receiving unit may first receive website ciphertext and a website private key identifier that are sent by the server, where the website ciphertext and the website private key identifier are received from the user terminal by the server during the handshake process with the user terminal. Then, the search unit may search for website private key plaintext corresponding to the website private key identifier. Afterwards, the third decryption unit may decrypt the website ciphertext by using the website private key plaintext to generate website plaintext. Finally, the fourth sending unit may send the website plaintext generated after the decryption to the server.

Figure 9:
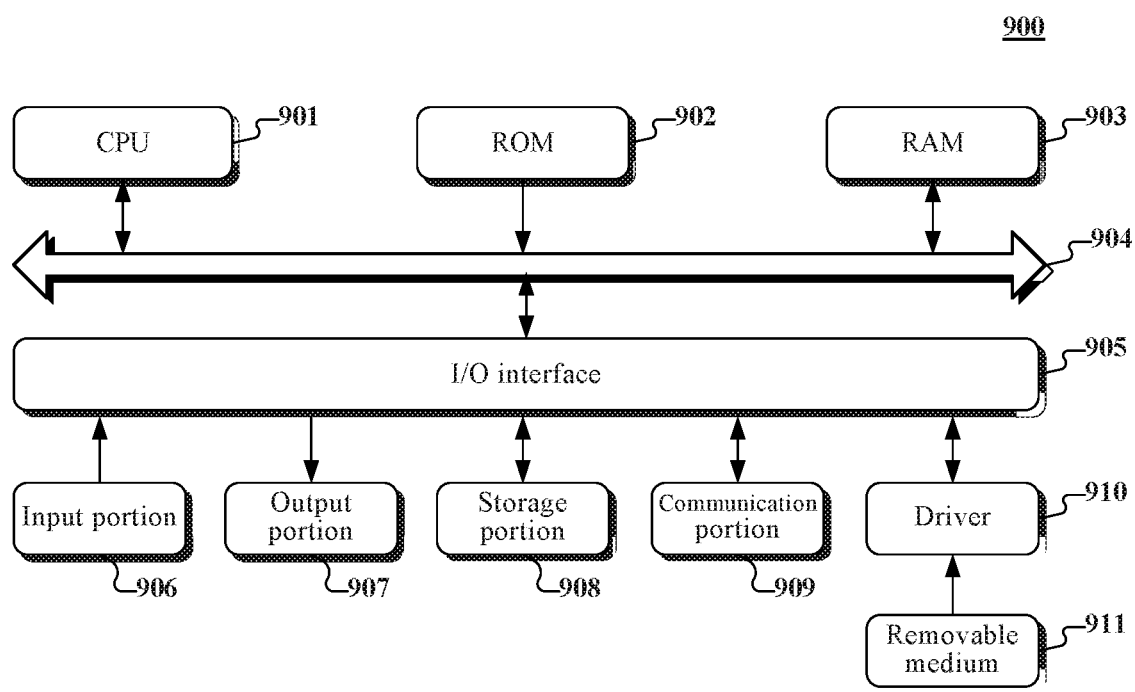
FIG. 9 illustrates a structural schematic diagram of a computer system adapted to implement a user terminal or server of the embodiments of the present application.

Referring to FIG. 9, a schematic structural diagram of a computer system 900 adapted to implement a server of the embodiments of the present disclosure is shown.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse etc.; an output portion 907 comprising a cathode ray tube (CRT), a liquid crystal display device (LCD), a speaker etc.; a storage portion 908 including a hard disk and the like; and a communication portion 909 comprising a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 908 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 909, and/or may be installed from the removable media 911. The computer program, when executed by the CPU 901, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a first receiving unit, an encryption unit, and a first sending unit, where the names of these units or modules are not considered as a limitation to the units or modules. For example, the first sending unit may also be described as "a unit for sending the website private key ciphertext to the terminal".

The units or modules involved in the embodiments of the present disclosure may be implemented by way of software or hardware. The described units or modules may also be provided in a processor, for example, described as: a processor, comprising a generation unit, a first sending unit, a first receiving unit, a first decryption unit, and a storage unit, where the names of these units or modules are not considered as a limitation to the units or modules. For example, the generation unit may also be described as "a unit for generating a key pair at random".

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: receive a public key sent from a terminal configured to perform encryption and decryption, wherein the public key is generated at random by the terminal; encrypt a website private key plaintext by using the public key to generate a website private key ciphertext, wherein the website private key plaintext is pre-acquired; and send the website private key ciphertext to the terminal, so that the terminal decrypts the website private key ciphertext by using the private key to generate the website private key plaintext and store the website private key plaintext in the terminal.

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: generate a key pair at random, wherein the key pair comprises a public key and a private key; send the public key to a server; receive a website private key ciphertext sent from the server, wherein the website private key ciphertext is generated by the server by encrypting a website private key plaintext with the public key, and the website private key plaintext is pre-acquired; decrypt the website private key ciphertext by using the private key, to generate the website private key plaintext; and store the website private key plaintext.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for storing a website private key plaintext, applied on a server, comprising:
   receiving a first public key sent from a first terminal, the first terminal being configured to perform encryption and decryption, a first key pair being randomly generated by the first terminal, the key pair comprising the first public key and a first private key;
   encrypting the website private key plaintext of a website by using the first public key to generate a website private key ciphertext, wherein the website private key plaintext is pre-acquired;
   sending the website private key ciphertext to the first terminal, wherein the first terminal decrypts said website private key ciphertext by using the first private key to generate the website private key plaintext and stores the website private key plaintext in the first terminal, wherein the sending the website private key ciphertext to the first terminal comprises:
   in response to a received instruction to delete the website private key plaintext, sending to the first terminal a website private key identifier corresponding to the website private key ciphertext obtained through encryption of the website private key plaintext to be deleted, wherein the first terminal searches for the website private key plaintext corresponding to the website private key identifier; and deletes the stored website private key plaintext and a corresponding relationship between the website private key plaintext and the website private key identifier;
   receiving a website ciphertext and the website private key identifier sent from a second terminal, wherein the second terminal is a user terminal, and said website private key identifier is obtained by performing calculation on the website private key ciphertext by using Message-Digest Algorithm 5;
   sending said website ciphertext and said website private key identifier sent from the second terminal to the first terminal, wherein the first terminal finds the stored website private key plaintext corresponding to the website private key identifier and generates a website plaintext by decrypting the website ciphertext with the found website private key plaintext, the corresponding relationship between the website private key plaintext and the website private key identifier being prestored in the first terminal; and
   receiving said website plaintext sent from the first terminal.

2. The method according to claim 1, wherein after the receiving the first public key sent from the first terminal the method further comprises:
   checking the first public key by:
      acquiring data with a preset length;
      encrypting the data by using the first public key, to generate a data ciphertext;
      sending the data ciphertext to the first terminal;
      receiving a data plaintext sent from the first terminal, wherein the data plaintext is generated by the first terminal by decrypting the data ciphertext with the first private key; and
      checking whether the data plaintext is consistent with the data;
   if the data plaintext is consistent with the data, encrypting the website private key plaintext by using the first public key; and
   if the data plaintext is not consistent with the data, sending an instruction for regenerating a second key pair to the first terminal, then receiving a second public key sent from the first terminal and repeating the checking the second public key.

3. The method according to claim 1, wherein the sending the website private key ciphertext to the first terminal comprises:
   in response to a received instruction for adding the website private key plaintext, sending to the first terminal the website private key identifier corresponding to the website private key ciphertext obtained through encryption of the website private key plaintext to be added, wherein the website private key identifier and the website private key ciphertext are pre-stored, and have a one-to-one correspondence.

4. A method for storing a website private key plaintext, applied to a terminal configured to perform encryption and decryption, comprising:
- generating a first key pair randomly, wherein the first key pair comprises a first public key and a first private key;
- sending the first public key to a server;
- receiving a website private key ciphertext sent from the server, wherein the website private key ciphertext is generated by the server by encrypting the website private key plaintext with the first public key, and the website private key plaintext is pre-acquired, wherein the receiving the website private key ciphertext sent from the server comprises:
  - receiving, from the server, a website private key identifier corresponding to the website private key ciphertext obtained through encryption of the website private key plaintext to be deleted, wherein the website private key identifier is sent from the server after the server receives an instruction for deleting the website private key plaintext; searching for the website private key plaintext corresponding to the website private key identifier; and deleting the website private key plaintext and a corresponding relationship between the website private key plaintext and the website private key identifier;
- decrypting the website private key ciphertext by using the first private key, to generate the website private key plaintext;
- storing the website private key plaintext;
- receiving a website ciphertext and the website private key identifier sent from the server, wherein the website ciphertext and the website private key identifier are received by the server and sent from a user terminal;
- searching for the website private key plaintext corresponding to the website private key identifier, the corresponding relationship between the website private key plaintext and the website private key identifier being stored in the terminal configured to perform encryption and decryption;
- decrypting the website ciphertext by using the website private key plaintext, to generate a website plaintext; and
- sending the website plaintext to the server.

5. The method according to claim 4, further comprising:
- receiving a data ciphertext sent from the server, wherein the data ciphertext is generated by the server by encrypting data with the first public key;
- decrypting the data ciphertext by using the first private key, to generate a data plaintext; and
- sending the data plaintext to the server.

6. The method according to claim 5, further comprising:
- regenerating a second key pair randomly in response to a received instruction for regenerating a second key pair sent from the server, and sending the regenerated second public key to the server.

7. The method according to claim 4, wherein
the receiving a website private key ciphertext sent from the server comprises:
- receiving, from the server, the website private key identifier corresponding to the website private key ciphertext obtained through encryption of the website private key plaintext to be added, wherein the website private key identifier and the website private key ciphertext are pre-stored and correspond one-to-one to each other, and the website private key identifier is sent from the server after the server receives an instruction for adding the website private key plaintext; and the storing the website private key plaintext comprises:
- storing the corresponding relationship between the website private key plaintext and the website private key identifier.

8. A system for storing a website private key plaintext, comprising:
- a server, configured to receive a first public key sent from a first terminal, the first terminal being configured to perform encryption and decryption, a first key pair being randomly generated by the first terminal, the first key pair comprising the first public key and a first private key, encrypt a website private key plaintext of a website by using the first public key to generate a website private key ciphertext, and send the website private key ciphertext to the first terminal, wherein the website private key plaintext is pre-acquired;
- the first terminal, configured to generate the first key pair randomly, send the first public key to the server, receive the website private key ciphertext sent from the server, decrypt the website private key ciphertext by using the first private key to generate the website private key plaintext, and store the website private key plaintext, wherein the first key pair comprises the first public key and the first private key;
- the server is further configured to receive a website ciphertext and a website private key identifier sent from a user terminal, a corresponding relationship between the website private key identifier and the website private key plaintext being stored in the first terminal, send the website ciphertext and the website private key identifier to the first terminal, and then receive a website plaintext sent from the first terminal;
- the first terminal is further configured to receive the website ciphertext and the website private key identifier sent from the server, search for the website private key plaintext corresponding to the website private key identifier, decrypt the website ciphertext by using the website private key plaintext to generate the website plaintext, and then send the website plaintext to the server;
- the server is further configured to send to the first terminal the website private key identifier corresponding to the website private key ciphertext obtained through encryption of the website private key plaintext to be deleted in response to a received instruction to delete the website private key plaintext; and
- the first terminal is further configured to receive, from the server, the website private key identifier corresponding to the website private key ciphertext obtained through encryption of the website private key plaintext to be deleted, search for the website private key plaintext corresponding to the website private key identifier, and delete the website private key plaintext and correspondence relationship between the website private key plaintext and the website private key identifier.

9. The system according to claim 8, wherein
the server is further configured to check the public key by: acquiring data with a preset length; encrypting the data by using the first public key to generate a data ciphertext, sending the data ciphertext to the first terminal, receiving a data plaintext sent from the first terminal, checking whether the data plaintext is consistent with the data; encrypting the website private key plaintext by using the first public key if the data plaintext is consistent with the data; and sending an instruction for regenerating a second key pair to the first terminal and then receiving a second public key sent from the first terminal and repeating the checking the second public key if the data plaintext is not consistent with the data; and the first terminal is further configured to: receive a data ciphertext sent from the server, decrypt the data ciphertext by using the first private key to generate a data plaintext, and then send the data plaintext to the server; and regenerate the second key pair randomly in response to a received instruction for regenerating the second key pair sent from the server, and send a regenerated second public key to the server.

10. The system according to claim 8, wherein
the server is further configured to send to the first terminal the website private key identifier corresponding to the website private key ciphertext obtained through encryption of the website private key plaintext to be added in response to a received instruction for adding the website private key plaintext, wherein the website private key identifier and the website private key ciphertext are pre-stored, and correspond one-to-one to each other; and the first terminal is further configured to receive, from the server, the website private key identifier corresponding to the website private key ciphertext obtained through encryption of the website private key plaintext to be added, and store correspondence relationship between the website private key plaintext and the website private key identifier.

11. An apparatus for storing a website private key plaintext, comprising:
at least one processor; and
a memory storing non-transitory computer readable instructions, which when executed by the at least one processor, cause the at least one processor to perform operations, the operations comprising:
receiving a first public key sent from a first terminal, the first terminal being configured to perform encryption and decryption, a first key pair being randomly generated by the first terminal, the first key pair comprising the first public key and a first private key;
encrypting the website private key plaintext of a website by using the first public key to generate a website private key ciphertext, wherein the website private key plaintext is pre-acquired; and
sending the website private key ciphertext to the first terminal, wherein the first terminal decrypts the website private key ciphertext by using the first private key to generate the website private key plaintext and store the website private key plaintext in the first terminal, wherein the sending the website private key ciphertext to the first terminal comprises:
in response to a received instruction to delete the website private key plaintext, sending to the first terminal a website private key identifier corresponding to the website private key ciphertext obtained through encryption of the website private key plaintext to be deleted, wherein the first terminal searches for the website private key plaintext corresponding to the website private key identifier; and deletes the website private key plaintext and a corresponding relationship between the website private key plaintext and the website private key identifier;
receiving a website ciphertext and the website private key identifier sent from a second terminal, wherein the second terminal is a user terminal, and said website private key identifier is obtained by performing calculation on the website private key ciphertext by using Message-Digest Algorithm 5;
sending the website ciphertext and the website private key identifier sent from the second terminal to the first terminal configured to perform encryption and decryption, wherein the first terminal finds the stored website private key plaintext corresponding to the website private key identifier and generates a website plaintext by decrypting the website ciphertext with the found website private key plaintext, the corresponding relationship between the website private key plaintext and the website private key identifier being prestored in the first terminal; and
receiving the website plaintext sent from the first terminal.

12. The apparatus according to claim 11, wherein after the receiving the first public key sent from the first terminal, the operations further comprises:
checking the first public key by:
acquiring data with a preset length;
encrypting the data by using the first public key, to generate a data ciphertext;
sending the data ciphertext to the first terminal;
receiving a data plaintext sent from the first terminal, wherein the data plaintext is generated by the first terminal by decrypting the data ciphertext with the first private key; and
checking whether the data plaintext is consistent with the data;
if the data plaintext is consistent with the data, encrypting the website private key plaintext by using the first public key; and
if the data plaintext is not consistent with the data, sending an instruction for regenerating a second key pair to the first terminal, then receiving a second public key sent from the first terminal and repeating the checking the second public key.

13. A The apparatus according to claim 11, wherein the sending the website private key ciphertext to the first terminal comprises:
in response to a received instruction for adding the website private key plaintext, sending to the first terminal the website private key identifier corresponding to the website private key ciphertext obtained through encryption of the website private key plaintext to be added, wherein the website private key identifier and the website private key ciphertext are pre-stored, and correspond one-to-one to each other.

14. An apparatus for storing a website private key plaintext, comprising:
at least one processor; and
a memory storing non-transitory computer readable instructions, which when executed by the at least one processor, cause the at least one processor to perform operations, the operations comprising:
generating a first key pair randomly, wherein the first key pair comprises a first public key and a first private key;
sending the first public key to a server;
receiving a website private key ciphertext sent from the server, wherein the website private key ciphertext is generated by the server by encrypting the website private key plaintext with the first public key, and the website private key plaintext is pre-acquired, wherein the receiving the website private key ciphertext sent from the server comprises:

receiving, from the server, a website private key identifier corresponding to the website private key ciphertext obtained through encryption of the website private key plaintext to be deleted, wherein the website private key identifier is sent from the server after the server receives an instruction for deleting the website private key plaintext; searching for the website private key plaintext corresponding to the website private key identifier; and deleting the website private key plaintext and a corresponding relationship between the website private key plaintext and the website private key identifier;

decrypting the website private key ciphertext by using the first private key, to generate the website private key plaintext;

storing the website private key plaintext;

receiving a website ciphertext and a website private key identifier sent from the server, wherein the website ciphertext and the website private key identifier are received by the server and sent from a user terminal;

searching for the website private key plaintext corresponding to the website private key identifier, the corresponding relationship between the website private key plaintext and the website private key identifier being stored in the terminal configured to perform encryption and decryption;

decrypting the website ciphertext by using the website private key plaintext, to generate a website plaintext; and sending the website plaintext to the server.

15. The apparatus according to claim 14, wherein the operations further comprises:

receiving a data ciphertext sent from the server, wherein the data ciphertext is generated by the server by encrypting data with the first public key;

decrypting the data ciphertext by using the first private key, to generate a data plaintext; and sending the data plaintext to the server.

16. The apparatus according to claim 15, wherein the operations further comprises:

regenerating a second key pair randomly in response to a received instruction for regenerating a second key pair sent from the server, and sending the regenerated second public key to the server.

17. The apparatus according to claim 14, wherein the receiving a website private key ciphertext sent from the server comprises:

receiving, from the server, the website private key identifier corresponding to the website private key ciphertext obtained through encryption of the website private key plaintext to be added, wherein the website private key identifier and the website private key ciphertext are pre-stored and correspond one-to-one to each other, and the website private key identifier is sent from the server after the server receives an instruction for adding the website private key plaintext; and the storing the website private key plaintext comprises:

storing the corresponding relationship between the website private key plaintext and the website private key identifier.

* * * * *